Jan. 14, 1941.    M. L. PUGH    2,228,731
TRANSFORMER CONTROL SYSTEM
Filed Dec. 6, 1939
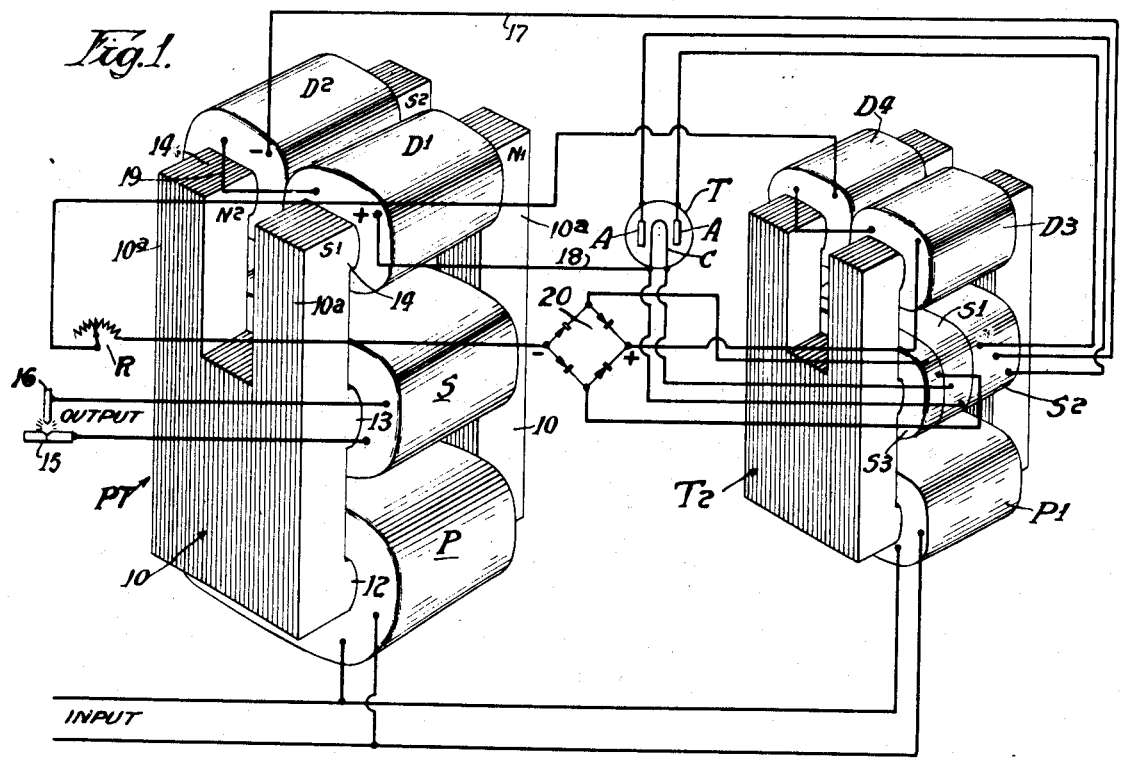
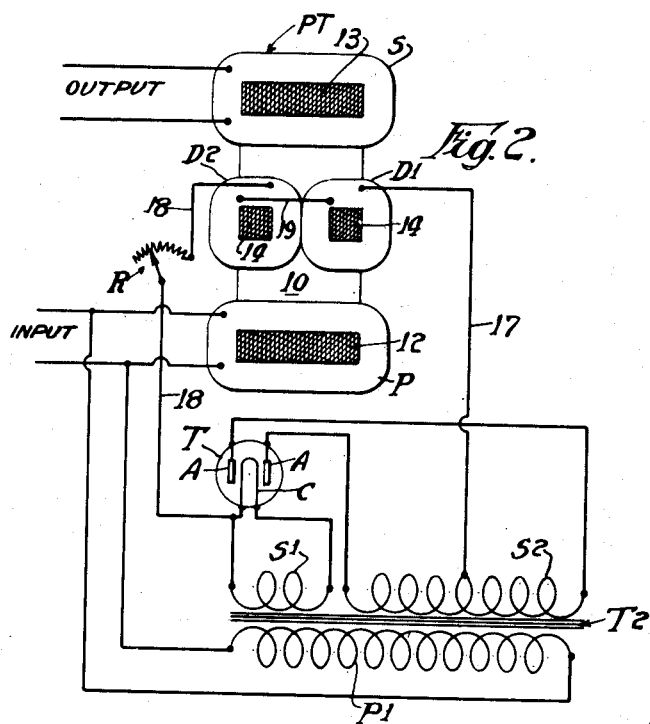
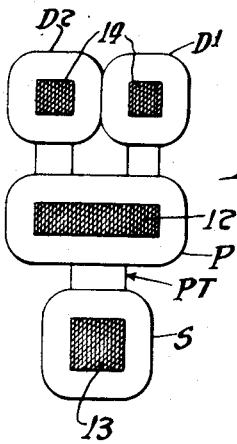
Inventor:
Merlin L. Pugh,
By Bair & Freeman
Attorneys.
Witness:
E. Campouri Patented Jan. 14, 1941

2,228,731

UNITED STATES PATENT OFFICE 2,228,731

TRANSFORMER CONTROL SYSTEM

Merlin L. Pugh, Minneapolis, Minn.

Application December 6, 1939, Serial No. 307,841

2 Claims. (Cl. 171—119)

My invention relates to a transformer, the output of which can be efficiently controlled in a very simple manner by a relatively low power rheostat.

One object of the invention is to provide a main or power transformer including a primary coil adapted to be supplied with alternating input current and a secondary coil for supplying an output current of different voltage, means being provided without the necessity of providing taps in the secondary coil for varying the output as desired, the entire structure being comparatively simple and inexpensive to manufacture.

A further object is to provide a transformer, the output of which can be varied in relatively small increments, as distinguished from relatively greater steps as when a tapped secondary or a tapped impedance in series with the secondary and the load is provided.

Another object is to provide a transformer which can be designed for a variety of uses and which has particular utility in the field of electric arc welding, the arrangement being such that a pair of relatively small wires may extend from the transformer to the point of use of the secondary current and a rheostat provided at that point for remotely controlling a relatively heavy secondary current.

More specifically, it is an object of my invention to provide a specially constructed power transformer including a pair of direct current coils mounted in opposition to each other and so associated with the core of the transformer that when there is relatively no current in the direct current coils, the core legs of the direct current coils will pass a large proportion of the magnetic flux so that it is thereby shunted around the secondary coil leg and results in a relatively small secondary output; it being possible to increase the amount of such output to maximum by increasing the amount of direct current supplied to the direct current coils, the direct current coils taking considerably less current than is supplied by the secondary of the transformer.

A further object is to provide means for supplying direct current to the direct current coils which consists of a second transformer connected with the alternating input current supply of the main transformer and operating a rectifier which in turn furnishes direct current for the direct current coils, the amount of such direct current being readily controlled, in a remote manner if desired, by a rheostat.

Still a further object is to provide a rectified current for the direct current coils in two or more steps, with each preceding step requiring less current, so that a still smaller rheostat may be used in the first step for controlling the ultimate supply of direct current to the direct current coils of the main or power transformer, which current is thereby substantially greater than that passing through the rheostat.

Other objects, purposes and characteristic features of the present invention will be in part obvious from the accompanying drawing and in part pointed out, as the description of the invention progresses. It is deemed unnecessary to fully describe and illustrate more than a few modifications of my invention to give a full understanding thereof both from its structural and functional standpoints. Accordingly, I have illustrated preferred and desirable embodiments in the accompanying drawing, which is not intended to be exhaustive and is not to be taken as limiting of the invention, but on the contrary is chosen with a view to illustrating my invention so that others skilled in the art may apply it under varying conditions of practical use and may make such changes therein as such conditions may make desirable.

With reference to the accompanying drawing, the views thereof are as follows:

Figure 1 is an electrodiagrammatic view of a transformer control system embodying my invention and showing a main or power transformer and a second transformer in perspective;

Figure 2 shows a cross section through a modified form of transformer, and a somewhat simpler control circuit therefor, and Figure 3 is a cross section through another modified form of transformer designed to secure the same results.

On the accompanying drawing I have used the reference character PT to indicate a power transformer, and $T^2$ a second transformer. The power transformer PT includes a pair of end legs 10 and legs 12 and 13 extending between the end legs. Wound on the legs 12 and 13 are the primary P and secondary S, respectively.

The legs 10 extend beyond the leg 13 and are divided into two parts indicated at 10a. Extending between the parts 10a are a pair of legs 14 on which direct current coils $D^1$ and $D^2$ are wound. The coils $D^1$ and $D^2$ are so connected with each other that their windings are in opposition. Accordingly, when direct current is supplied to them, the legs 14 will have poles of opposite polarity indicated at $N^1$, $S^1$, $N^2$ and $S^2$. Conversely, when a magnetic flux is caused to traverse the core of the transformer PT, due to the energization of the primary coil P, currents induced in the coils $D^1$ and $D^2$ will buck each other if the circuit through these coils is closed.

The primary P of the power transformer PT is connected with a suitable source of alternating current, indicated "Input" on the drawing. The secondary coil S is adapted to supply current to a load indicated "Output." Such load, by way of example, may comprise an arc welding apparatus, shown diagrammatically at 15 and 16. 15 is the work being welded and 16 is the welding rod.

The direct current coils $D^1$ and $D^2$ are connected with any suitable source of direct current. By way of example, a second transformer $T^2$ of smaller capacity than the power transformer PT may be provided. The primary $P^1$ of the second transformer $T^2$ may be supplied with the same input current as the primary of the power transformer. A secondary coil $S^1$ supplies current for the filament or cathode C of a rectifying tube T. A secondary coil $S^2$ has its ends connected with the plates or anodes A of the rectifying tube T and a center tap connected by a wire 17 to one of the direct current coils, for instance, $D^2$. A wire 18 then connects the other coil $D^1$ with the cathode C and a wire 19 connects the coils $D^1$ and $D^2$ together.

For controlling the amount of secondary current from the secondary coil $S^2$ which is rectified and supplied to the direct current coils $D^1$ and $D^2$, I provide similarly arranged direct current coils $D^3$ and $D^4$ on the transformer $T^2$. These coils are supplied with direct current from a rectifier 20, such as one of the dry plate type. Alternating current is supplied by a third secondary coil $S^3$ to the rectifier 20 and is rectified thereby. The direct current output of the rectifier 20 is adjustable by means of a rheostat R. The rheostat R may, if desired, be located adjacent the point of current output from the power transformer PT, such as by mounting it on a holder for the electrode 16 in an obvious manner.

In Figure 2, I show a modified arrangement in which the legs 14 for the direct current coils $D^1$ and $D^2$ are mounted between the primary and secondary coil legs 12 and 13. Such an arrangement is workable, as is also the arrangement shown in Figure 3. In this figure, the primary coil instead of the secondary coil is located adjacent the direct current coils $D^1$ and $D^2$, and the cross section of the secondary coil leg has been modified.

Figure 2 also illustrates a simplified arrangement in which the transformer $T^2$ again supplies current for the filament C of the tube T, but instead of the rectifier 20 of Figure 1 being utilized, it is eliminated and the rectified current supplied by the tube T passes directly through the wires 17 and 18 to the coils $D^1$ and $D^2$. The rheostat R is then interposed in one of these wires so as to control the output of the rectifying tube T to the coils $D^1$ and $D^2$ instead of controlling the input to the tube, as in Figure 1. Such an arrangement makes it necessary to have heavier wires at 18 and a heavier rheostat R, which obviously in some installations would be permissible.

*Practical operation*

The alternating current flux set up in the core of the transformer PT by energization of the primary P will take the path of least resistance in completing its magnetic circuit. Accordingly, if there is no current in the D. C. coils $D^1$ and $D^2$ and the secondary circuit is closed, resistance to flux flow through the leg 13 will be set up and the magnetic flux will flow through the legs 14 until the point of saturation is reached. By having the area of the legs 14 less than the area of the leg 12 or the leg 13, there will be some magnetic flow through the leg 13 but it will be reduced in proportion to the relative area of both legs 14 in relation to the area of the leg 12. If the area of both legs 14 is as great as the area of the leg 12, then obviously there would be relatively no flow through the leg 13. In most installations, however, the minimum current to be delivered by the secondary S is somewhat above zero, and accordingly the areas of the legs 14 are designed so as to determine such minimum output when the direct current flow through the coils $D^1$ or $D^2$ is at or adjacent zero.

To increase the output from the secondary S, the direct current supplied to the coils $D^1$ and $D^2$ is increased. The direct current produces a non-alternating magnetic flux in the legs 14, the strength of which increases with an increase of direct current flow. Accordingly, the greater the direct current flow, the greater the resistance in the legs 14 to flow of magnetic flux shunted by the legs 14 around the leg 13. Accordingly, there will be relatively greater flow of magnetic flux through the leg 13 resulting in a relatively greater output current from the secondary S. When the coils $D^1$ and $D^2$ are energized with direct current to the point of saturation of the legs 14, then there will be maximum output from the secondary coil S.

Winding of the direct current coils $D^1$ and $D^2$ in series and in opposition causes the resultant of the alternating current voltage built up in each one of them to be zero. Thus there is no induced alternating current from the coils $D^1$ and $D^2$ feeding back to the output of the tube T. Likewise, the coils $D^3$ and $D^4$ of the second transformer $T^2$ are wound in opposition for the purpose of preventing alternating feed back to the direct current side of the rectifier 20.

I have described how an increase of direct current in the coils $D^1$ and $D^2$ will cause an increase in the output from the secondary S. Such increase of current is effected by changing the setting of the rheostat R so that its resistance is less and thereby the coils $D^3$ and $D^4$, in a manner similar to the coils $D^1$ and $D^2$, permit greater flow of output current from the secondary coil $S^2$ of the second transformer $T^2$. Since this is the current that is supplied to the rectifier tube T and rectified thereby, it has the direct effect of changing the value of the current in the coils $D^1$ and $D^2$.

By the arrangement described in Figure 1, I have found it possible to control 15,000 watts of power from the power transformer PT with a four-watt rheostat R. Since a four-watt rheostat is relatively small, the output of the power transformer PT may be remote control very conveniently, as relatively small wires are required to carry the current to and from the rheostat. The four-watt output circuit of the rectifier 20 controls a relatively heavier current by a second step through the rectifier tube T, which current is then supplied to the direct current coils $D^1$ and $D^2$ of the power transformer.

With the arrangement shown in Figure 2, the rheostat R must be relatively heavier, as it is in circuit with the coils $D^1$ and $D^2$. There are many installations, however, where this is permissible, particularly where remote control is unnecessary, and the rheostat R of Figure 2 may thereby be located adjacent the power transformer.

I have found a transformer controlled by the system herein disclosed has characteristics which are particularly desirable for certain installations. One of these characteristics is that immediately upon closing the secondary circuit when there is direct current flowing through the coils $D^1$ and $D^2$, a surge of current of about twice the normal or running value and lasting from one to three seconds rushes through the secondary circuit. This is probably due to the magnetic flux created by the direct current flowing in the coils $D^1$ and $D^2$ before the secondary circuit is closed. At the instant of such closing, the magnetic flux of alternating character created by the primary coil P rushes through the core of the power transformer and, since the direct current in the coils $D^1$ and $D^2$ is producing a non-alternating magnetic flux in the legs 14, a great many more alternating flux lines cut through the secondary coil S until they are able to break down some of the non-alternating flux in the leg 14. Thereupon the alternating flux lines cutting the secondary coil are decreased as those in the legs 14 increase. At the end of one to three seconds, a steady state condition obtains when the resistance to the flow of the alternating magnetic flux becomes equal in each magnetic circuit and the output of the secondary thereafter remains constant (until such time as the rheostat R is readjusted). The surge of current in the secondary circuit or output is due to the increased number of magnetic lines that cut the secondary coil when the circuit is first closed. This is a very desirable characteristic in many transformer operations, and particularly in welding operations. It results in the possibility of the operator starting an arc with ease, since the surge of current amounts to about twice the steady state welding current. This permits the use of a lower open circuit voltage, which makes a safer machine for the operator to use. The results obtained, it is obvious, are possible from a relatively simple constructional arrangement of transformer with direct current coils built into it and a suitable supply of direct current therefor.

From the foregoing description of my transformer and the system whereby I control it, it is apparent that I have devised a practical and efficient construction for carrying out the desired objects of the invention, particularly with respect to a simple and economical unit of the character described. While the foregoing specification and the attached drawing represent preferred forms of the invention, I desire to reserve the right to make whatever changes or modifications may fairly fall within the scope of the appended claims.

What I claim as new and desire to secure by Letters Patent of the United States is:

1. In a welding transformer control system, a power transformer comprising a primary coil adapted to be supplied with alternating input current, a secondary coil for supplying an alternating output current, a pair of direct current coils connected in opposition so that the resultant magneto-motive force is substantially zero, a core having a pair of alternating current coil legs and a pair of direct current coil legs for said primary, secondary and direct current coils respectively, said core having six connecting legs for said coil legs, two of which connect said alternating current coil legs together, two of which connect one of said direct current coil legs with one of said alternating current coil legs, and the remaining two of which independent of said last two connecting legs connect the other direct current coil leg with said last mentioned alternating current coil leg, means for supplying direct current to said direct current coils and means for varying the value of the direct current supplied to said direct current coils.

2. In a control system for supplying alternating current having an initial surge output characteristic following closure of the load circuit, a power transformer comprising a primary coil adapted to be supplied with alternating input current, a secondary coil adapted to supply a variable alternating output current, a pair of direct current coils connected in opposition so that the resultant magneto-motive force is substantially zero, a core having three sections, one of said sections traversing said primary coil and said secondary coil, and being rectangular in shape, having only a primary coil leg, a secondary coil leg and a pair of connecting legs, the second section traversing said primary coil, said secondary coil and one of said direct current coils and the third section traversing said primary coil, said secondary coil and the other of said direct current coils, a source of direct current to supply said direct current coils and means for varying the value of the direct current supplied thereto, the output of said secondary being varied by the amount of direct current flux in the direct current legs of said core, said initial surge of alternating output current, when said load circuit is closed, being brought about by gradual breakdown of direct current flux in said direct current coil legs by the alternating current flux until the resistance to said alternating current flux is equal in said direct current coil legs and in the coil leg surrounded by said secondary coil.

MERLIN L. PUGH.